United States Patent
Dabbish

(10) Patent No.: US 6,169,492 B1
(45) Date of Patent: Jan. 2, 2001

(54) REMOTE KEYLESS ENTRY USER-TRANSPARENT AUTO RE-SYNCHRONIZATION APPARATUS AND METHOD

(75) Inventor: Ezzat Dabbish, Cary, IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/124,664

(22) Filed: Jul. 29, 1998

(51) Int. Cl.[7] .................................................. G06F 7/04
(52) U.S. Cl. .................. 340/825.31; 370/389; 375/354; 340/825.2
(58) Field of Search ................... 340/825.31, 825.2, 340/825.56, 825.72, 825.34, 825.14; 361/171, 172; 235/382.5; 375/354, 377; 370/324, 503, 389

(56) References Cited

U.S. PATENT DOCUMENTS 4,847,614 * 7/1989 Keller ............................ 340/825.56
5,852,944 * 12/1998 Collard, Jr. et al. .................. 70/278

* cited by examiner

Primary Examiner—Michael Horabik
Assistant Examiner—Matsuichiro Shimizu
(74) Attorney, Agent, or Firm—Simon B. Anolick

(57) ABSTRACT

A method of user-transparent auto re-synchronization for a remote keyless entry system includes assigning a default challenge-count window (101). A first data packet including a first transmitter-side symbolic count (103) and a first command code is transmitted by a transmitter (200) and authenticated by a receiver (250). An auto-synchronization challenge-count window is assigned when the first transmitter-side symbolic count (103) is not bounded within the challenge-count window (109). A second data packet including a second transmitter-side symbolic count (103) and a second command code is transmitted by the transmitter (200) and authenticated by the receiver (250). The challenge-count window is returned to the default challenge-count window, when the second transmitter-side symbolic count is bounded within the auto-synchronization challenge-count window and the receiver-side symbolic count (123). Then the second command code is executed (127).

12 Claims, 2 Drawing Sheets

REMOTE KEYLESS ENTRY USER-TRANSPARENT AUTO RE-SYNCHRONIZATION APPARATUS AND METHOD

FIELD OF THE INVENTION

This invention is related to the field of remote keyless entry systems for use in vehicular applications and more particularly to an authentication system with a user-transparent auto re-synchronization apparatus and method.

BACKGROUND OF THE INVENTION

Contemporary vehicle's often employ Remote Keyless Entry (R.K.E.) systems that include control functions such as those to unlock doors of the vehicle, start the engine in the vehicle, or to open a garage door. Typically radio signals are transmitted from an R.K.E. transmitter which is typically a portable device, to an R.K.E. receiver which is typically mounted in a vehicle or in a garage. When the radio signals are transmitted, it is feasible, using electronic eavesdropping, to record the radio signals for later re-transmission to operate the control functions of the vehicle or the garage door opener.

To dissuade unauthorized access, R.K.E. systems are made more secure by digitally encoding the radio signals transmitted between the R.K.E. transmitter and the R.K.E. receiver. Before the digitally encoded radio signals received by the R.K.E. receiver can be used, their origin needs to be validated. This validation process is often called authentication.

One protection mechanism built into many R.K.E. authentication systems is a device or procedure called a rolling counter. Typically, when a control function, such as "unlock doors of the vehicle" is selected by the user by depressing an associated key on an R.K.E. keypad, an R.K.E. transmitter-side counter is incremented. The symbolic count of this R.K.E. transmitter-side counter is encoded along with the "unlock doors of the vehicle" command and various other data and transmitted to the R.K.E. receiver. The R.K.E. receiver then decodes the various data including the symbolic count of the R.K.E. transmitter-side counter which is compared with a symbolic count of an R.K.E. receiver-side counter. Sometimes this is called a challenge-count. If the symbolic count of the R.K.E. transmitter-side counter matches the symbolic count of the R.K.E. receiver-side counter, then the user command is authenticated and the R.K.E. receiver unlocks the doors of the vehicle. A match is typically considered to be an incremental symbolic value within a range of the R.K.E. receiver-side counter. For example, if the R.K.E. receiver-side counter is 1,983 counts, indicating that 1,983 R.K.E. authentic transmissions have been received, and the received symbolic count of the R.K.E. transmitter-side counter is 1,984 counts, a match is implied. If the received symbolic count of the R.K.E. transmitter-side counter is 1,990, then a match has occurred because the received symbolic count was about the same as the receiver-side counter but also greater than the receiver-side counter. Some systems look for a unit incremental count, and some systems allow a range of incremental counts—such as a range of 256 counts. Provision of this range anticipates that the user may inadvertently press a key of the R.K.E. keypad, incrementing the symbolic count of the R.K.E. transmitter-side counter. The range is kept to a relatively small value such as 256 counts to discourage massive replay attacks.

Sometimes a user can inadvertently increment the transmitter-side counter beyond the range. When this happens the R.K.E. system needs to be re-synchronized. While various authentication methods and systems exist they are inadequate because they lack an efficient approach for re-synchronizing the R.K.E. system without requiring any specific action on the user's part while maintaining the existing cryptographic robustness against various attacks. Some schemes require a specific user re-synchronization sequence. Users have to go find a manual to know what that sequence is. Imagine trying to get into your car and finding out you have to go find a manual.

What is needed is an improved approach that will automatically re-synchronize an R.K.E. receiving unit to one of its corresponding transmitting units in a manner that is totally transparent to the user and preserves the existing cryptographic strength of the system.

DETAILED DESCRIPTION OF A PREFERRED EMBODIMENT

Figure 1A:
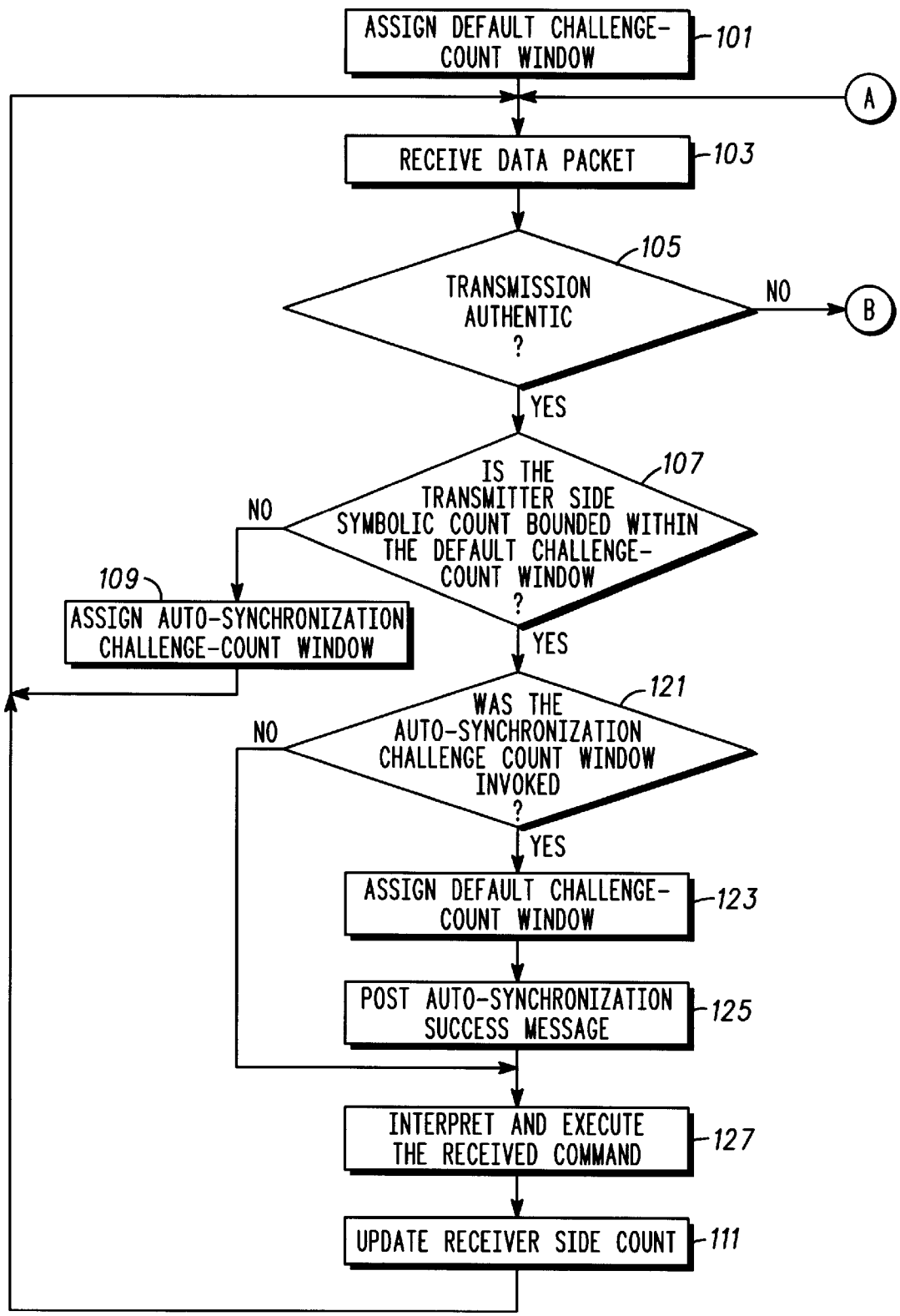
FIG. 1 is a flow chart showing a preferred method of the receiver portion of a Remote Keyless Entry (R.K.E.) system in accordance with the preferred embodiment of the invention.

A method of user-transparent auto re-synchronization for a Remote Keyless Entry (R.K.E.) system includes assigning a default challenge-count window. A first data packet, including a first transmitter-side symbolic count and a first command code, is transmitted by a transmitter and authenticated by a receiver. An auto-synchronization challenge-count window is assigned when the first transmitter-side symbolic count is not bounded within the default challenge-count window. A second data packet including a second transmitter-side symbolic count and a second command code is transmitted by the transmitter and authenticated by the receiver. The challenge-count window is returned to the default challenge-count window, when the second transmitter-side symbolic count is bounded within the auto-synchronization challenge-count window. Then the second command code is executed.

Essentially, a symbolic counter on the receiver side of the system holds what is typically referred to as a challenge-count. If everything is normal, i.e. the system is synchronized, a symbolic counter on the transmitter side should hold the exact same symbolic value as the counter on the receiver side. When the user activates a command button on the R.K.E. transmitter, the transmitter-side counter is advanced by a unit symbolic count. The R.K.E. transmitter then assembles a message in the form of a data packet, and transmits it to the receiver.

When received and authenticated this transmitter-side count is compared to the challenge-count residing in the receiver-side counter. A relatively-wide window, or range, of symbolic values will be accepted as a match, to allow for a few inadvertent command button activations. Typically, a default challenge-count window of 256 symbolic counts is used; so that if the authenticated transmitter-side count is within 256 symbolic counts of the value of the challenge-count residing in the receiver-side counter, then a match is recognized, and the challenge-count residing in the receiver-side counter is forced to the symbolic value of the authenticated transmitter-side count.

If the received and authenticated transmitter-side count does not fall within the default challenge-count window of 256 symbolic counts, then the system is out-of-synchronization. To avoid manual re-synchronization an automatic method is performed. Essentially, a temporary challenge-count window of acceptable counts is created. This challenge-count window is both smaller in range and is offset synchronized with the received and authenticated transmitter-side count.

A working example may be helpful here.

receiver-side challenge-count=345 symbolic count range=256

345<challenge-count window<(345+256)

If the received and authenticated transmitter-side count= 1459, then change the challenge-count window to:

1459<challenge count window<(1459+16).

Then, the receiver awaits the next transmission from the transmitter. By reducing the challenge-count window range, the method requires that a count within the reduced range is received and authenticated to confirm the previous count in order to enable the user to gracefully resynchronize the system. The security of the system remains intact since the method requires that the count continues to advance, thus discourages replay attack on the system.

If the subsequent received and authenticated transmitter-side count matches the receiver-side count within the smaller-range and offset challenge-count window, then the system is re-synched and the receiver-side challenge counter is forced to the symbolic value of the received and authenticated transmitter-side counter. In the working example introduced above, if the subsequent received and authenticated transmitter-side count is 1460, or actually any challenge count 1459<count<(1459+16), then the receiver-side challenge-count is set to 1460 and the challenge-count window is set to 1460<challenge count window<(1460+ 256). Subsequently a message will be sent from the receiver to a visual display on a dashboard of a vehicle that the receiver is mounted in, to inform the user of the successful auto re-synchronization process.

If the subsequent received and authenticated transmitter-side count does not match the receiver-side count, or challenge-count, within the smaller-range challenge-count window, then the method may either return the challenge-count window range to its default value since no further confirmation to the first authenticated symbolic count was received, or it may wait for a few more transmissions before doing so. Now that the overall approach has been described a hardware platform for executing the preferred method will be detailed.

Figure 2:
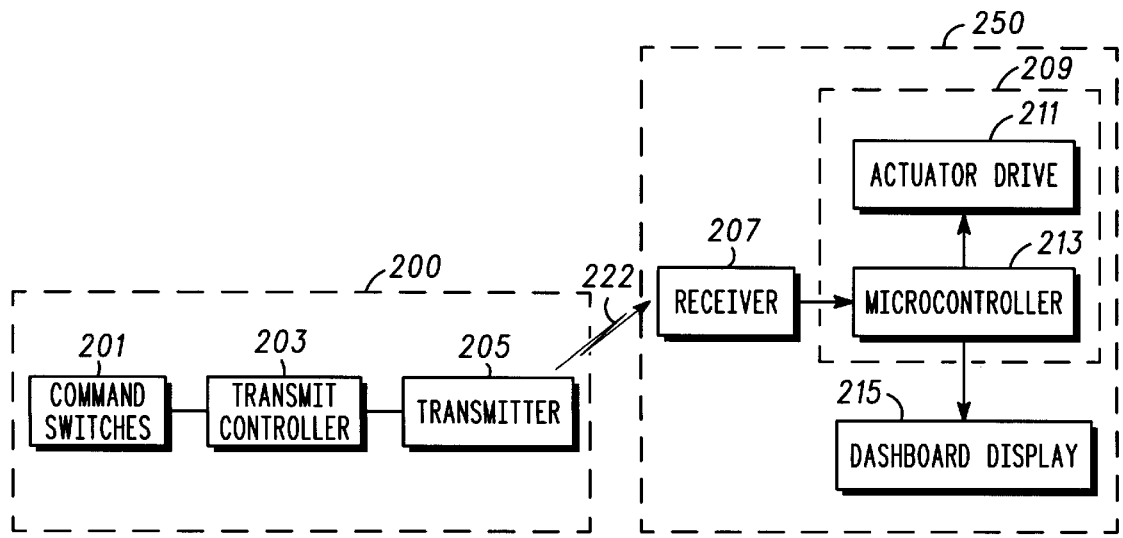
FIG. 2 is a schematic block diagram of a R.K.E. system in accordance with a preferred embodiment of the invention.

FIG. 2 is a schematic block diagram of the R.K.E. system. The hand-held R.K.E. transmitter device 200, also referred to as a transmitter, includes a transmit controller 203, which interprets the command switches 201, and transmits an assembled data packet 222 using its transmitter 205. The transmit controller 203 can be constructed using digital circuitry, a microcontroller, or any other mechanism which essentially transmits an encoded message. In the preferred embodiment a Motorola MC68HC05 microcontroller is used.

Figure 1B:
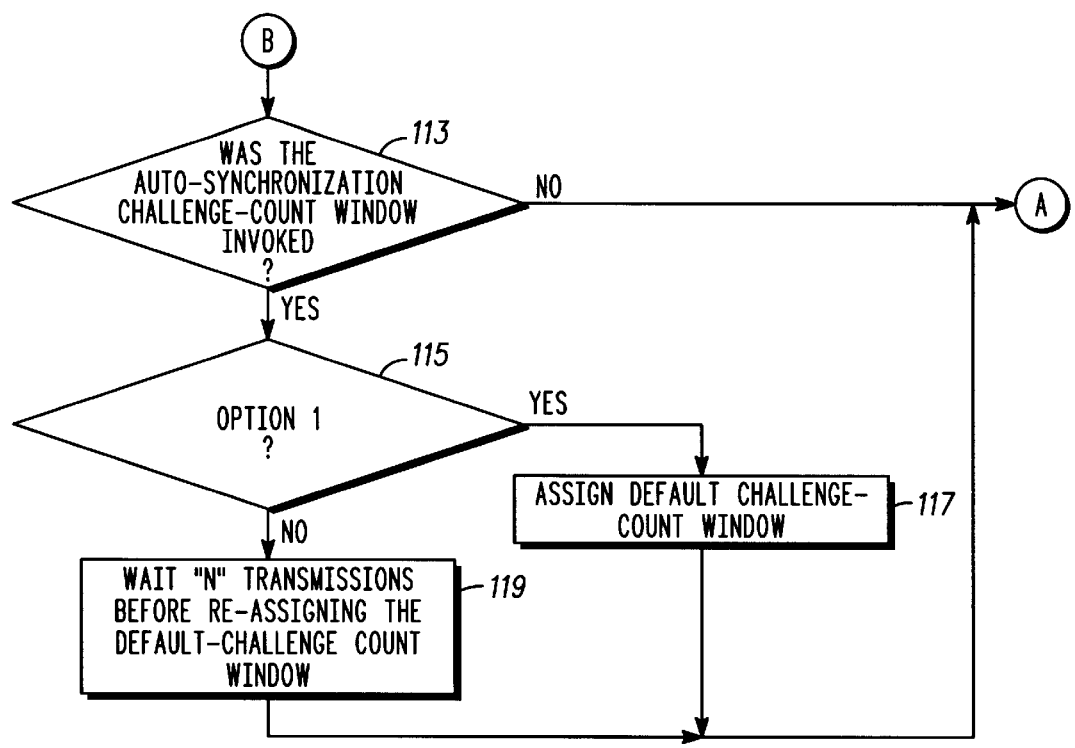

An R.K.E. control system 250, also referred to as a receiver, includes a receiver controller 209. Note that the R.K.E. control system 250 is mounted in a vehicle. The receiver controller 209 includes an actuator drive circuit 211, and another microcontroller 213. According to the preferred method, the receiver controller 209 receives the transmitted data packet 222 via its receiver 207. The microcontroller 213, again preferably a Motorola MC68HC05 microcontroller with on-board program memory to store the portion of the preferred method described later, interprets the data packet 222 and commands the actuator drive 211 to drive external actuators. These external actuators include door lock solenoids and engine starting devices. A dashboard display 215 will be used to display a visible message on the vehicle's dashboard that an auto-synchronization successfully was attempted. Now that the hardware platform has been presented, the preferred steps will be detailed with reference to FIG. 1.

In step 101 a default challenge-count window is assigned. Typically this window has a relatively large range—like 256 counts, and is offset based on the present receiver-side symbolic count.

Next, in step 103 the receiver 250 awaits and receives a first data packet from the transmitter device 200. The data packet includes a first transmitter-side symbolic count and a first command code, corresponding to one of the command switches 201. Typically a data packet also includes a random number, a unit identification/serial number, an authentication symbol, and a CRC or Cyclic Redundancy Check symbol.

Then, in step 105 the first received data packet is authenticated. Authentication is a process that checks for authenticity of the received message. If the first received data packet is deemed authentic, then the method proceeds to step 107.

In step 107 the transmitter-side symbolic count is checked to see if it's bounded within the default challenge-count window. If the transmitter-side symbolic count is outside of the range of the default challenge-count window, then an auto-synchronization process must be invoked.

In step 109 the challenge-count window is reduced by assigning an auto-synchronization challenge-count window that has a relatively small range of symbolic counts—like 16, is offset by the transmitter-side symbolic count, and the method returns to step 103 to await another transmitted data packet.

If the transmitter-side symbolic count is bounded within the default challenge-count window, then step 121 is executed. In step 121 the method checks to see if the challenge-count window was earlier changed to the auto-synchronization challenge-count window. If the challenge-count window had been changed, and step 107 yielded a "yes" response, then the transmitter-side count received in the last data packet essentially matched the receiver-side challenge-count.

Next, in step 123 the challenge-count window is returned to its default value—here 256, and commences at the symbolic value of the received transmitter-side challenge-count.

In step 125 an auto-synchronization success message is posted to the dashboard display 215 to inform the user that re-synchronization was successfully attempted.

Then, in step 127 the received command code is interpreted and executed by activating the actuator drive 211.

Next, in step 111 the receiver-side challenge counter is equated (updated) to match the received transmitter-side symbolic count, and the method returns to step 103 to await another transmitted data packet.

In another case, when step 105 determines that the transmission was not authentic, step 113 is executed. In step 113 the method checks to see if the challenge-count window was earlier changed to the auto-synchronization challenge-count window. If the challenge-count window had not been changed, then the method would not be attempting to re-synchronize the system, the unauthorized transmission would be ignored and the method returns to step 103 to await another transmitted data packet.

If the challenge-count window had been changed to the auto-synchronization challenge-count window, then step 115 is invoked. In step 115 the method checks to see if option 1 is selected. Option 1 works like a filtering mechanism. If option 1 was selected, then the challenge-count window is returned to its default value in step 117 and the method returns to step 103 to await another transmitted data packet. If option 1 is not selected, then the method waits for several passes through step 119 (essentially "n" transmissions, or passes through method steps 103, 105, 113, 115, and 119) before returning the challenge-count window to its default value. This option 1 path provides the user a few more chances to resynchronize the system.

The above-described method and apparatus automatically re-synchronizes an R.K.E. receiving unit to one of its corresponding transmitting units in a manner that is totally transparent to the user. By implementing the described method cryptographic and no-cryptographic scanning attacks are discouraged and the existing cryptographic strength of the system is thus preserved.

What is claimed is:

1. A method of user transparent auto re-synchronization for a remote keyless entry system comprising the steps of:
   assigning a default challenge-count window;
   receiving a first data packet including a first transmitter-side symbolic count and first command code;
   authenticating the first received data packet;
   assigning an auto-synchronization challenge-count window offset dependent on the first transmitter-side symbolic count when the first transmitter-side symbolic count is not bounded within the default challenge-count window;
   receiving a second data packet including a second transmitter-side symbolic count and second command code;
   authenticating the second received data packet;
   returning the challenge-count window to the default challenge-count window, when the second transmitter-side symbolic count is bounded within the auto-synchronization challenge-count window; and
   executing the second command code.

2. A method in accordance with claim 1 wherein the auto-synchronization challenge-count window has a range smaller than a range of the default challenge-count window.

3. A method in accordance with claim 1 further comprising the steps of:
   receiving a third data packet comprising a third transmitter-side symbolic count and a third command code;
   authenticating the third received data packet;
   returning the challenge-count window to the default challenge-count window, when the third transmitter-side symbolic count is bounded within the auto-synchronization challenge-count window; and
   executing the third command code.

4. A method in accordance with claim 1, responsive to the step of assigning the auto-synchronization challenge-count window:returning the challenge-count window to the default challenge-count window.

5. A method in accordance with claim 1, responsive to the step of assigning the auto-synchronization challenge-count window:
   waiting for a predetermined number of steps of receiving and authenticating data packets, then returning the challenge-count window to the default challenge-count window.

6. A method in accordance with claim 1 further comprising the step of:
   posting an auto-synchronization success message after executing the step of returning the challenge-count window to the default challenge-count window.

7. A method in accordance with claim 1 further comprising the step of:
   equating the receiver-side count dependent on the transmitter-side count, after the step of executing the second command code.

8. A method of user-transparent auto re-synchronization for a remote keyless entry system comprising the steps of:
   assigning a default challenge-count window;
   receiving a first data packet comprising a first transmitter-side symbolic count and a first command code;
   authenticating the first received data packet;
   assigning an auto-synchronization challenge-count window when the first transmitter-side symbolic count is not bounded within the default challenge-count window;
   receiving a second data packet comprising a second transmitter-side symbolic count and a second command code;
   authenticating the second received data packet;
   returning the challenge-count window to the default challenge-count window, when the second transmitter-side symbolic count is bounded within the auto-synchronization challenge-count window;
   posting an auto-synchronization success message after executing the step of returning the challenge-count window to the default challenge-count window;
   executing the second command code; and
   updating the receiver-side count dependent on the transmitter-side count after the step of executing the second command code.

9. A method in accordance with claim 8 wherein the step of assigning an auto-synchronization challenge-count window comprises assigning an auto-synchronization challenge-count window offset dependent on the first transmitter-side symbolic count when the first transmitter-side symbolic count is not bounded within the default challenge-count window.

10. A method in accordance with claim 9 wherein the auto-synchronization challenge-count window has a range smaller than a range of the default challenge-count window.

11. A method in accordance with claim 8 wherein the auto-synchronization challenge-count window has a range smaller than a range of the default challenge-count window.

12. An apparatus for user-transparent auto re-synchronization for a remote keyless entry system comprising:
   a transmitter for tansmitting a first data packet including a first transmitter-side symbolic count and a first command code;
   a receiver for;
      assigning a default challenge-count window;
      receiving and authenticating the first data packet transmitted by the transmitter;

assigning an auto-synchronization challenge-count window offset dependent on the first transmitter-side symbolic count when the first transmitter-side symbolic count is not bounded within the default challenge-count window;

receiving a second data packet comprising a second transmitter-side symbolic count and a second command code;

authenticating the second received data packet;

returning the challenge-count window to the default challenge-count window, when the second transmitter-side symbolic count is bounded within the auto-synchronization challenge-count window;

posting an auto-synchronization success message after executing the step of returning the challenge-count window to the default challenge-count window;

executing the second command code; and updating the receiver-side count dependent on the transmitter-side count after the step of executing the second command code.

* * * * *